May 5, 1931.  C. B. CURTISS  1,803,895
TORQUE EQUALIZING MECHANISM
Filed June 20, 1928  3 Sheets-Sheet 1
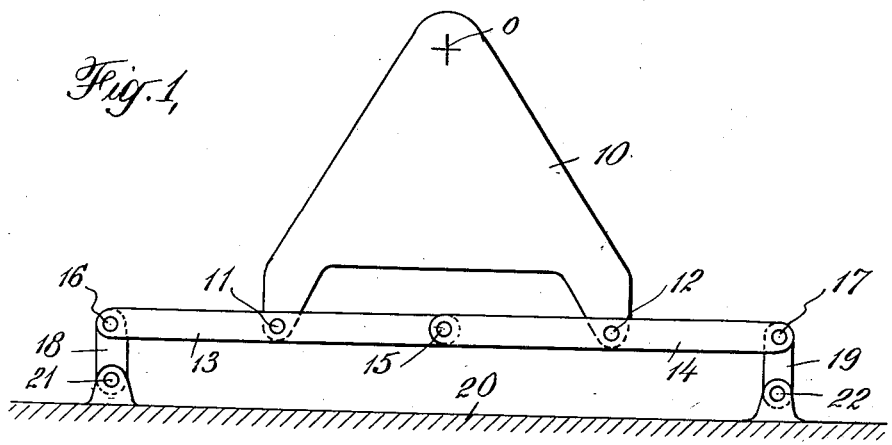
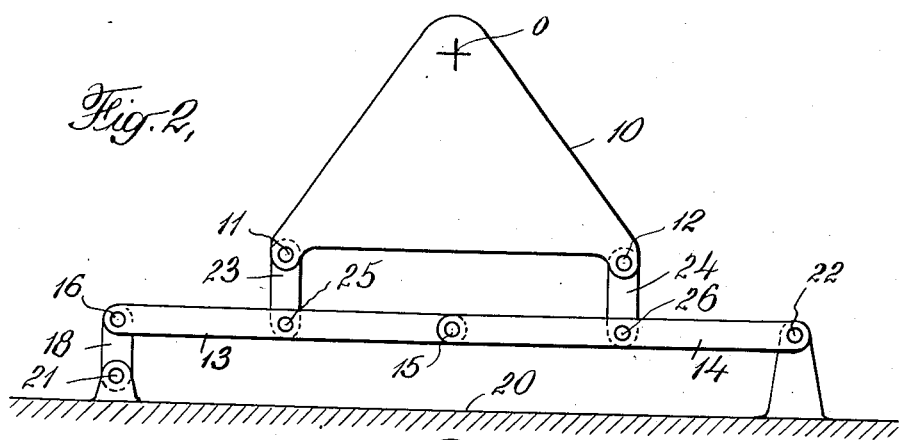
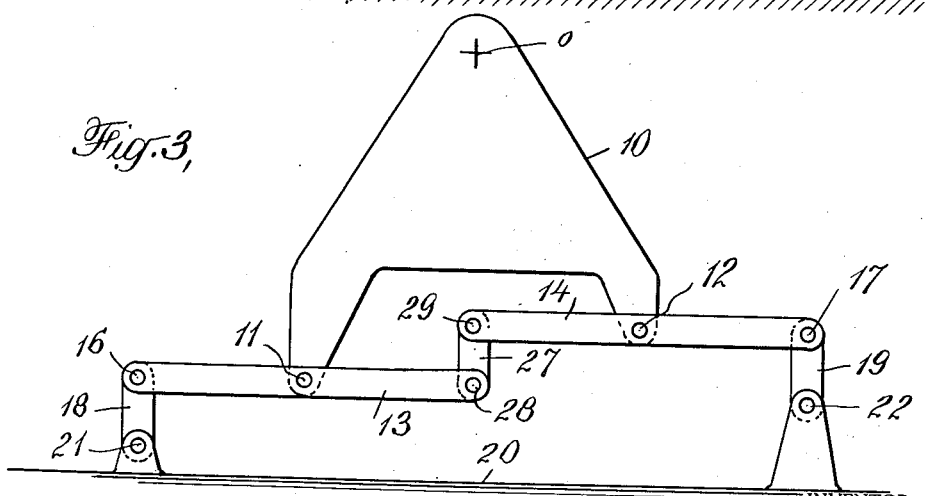
INVENTOR
Charles B. Curtiss
BY
Pennie, Davis, Marvin & Edmonds
ATTORNEYS

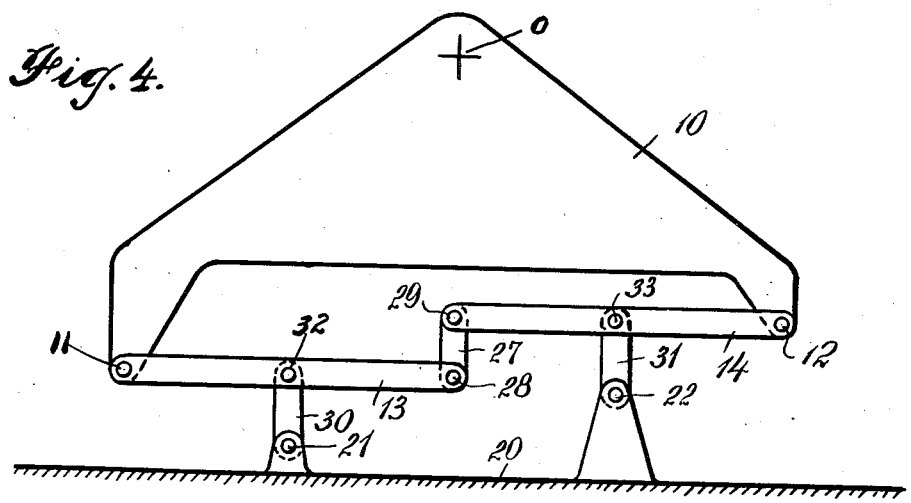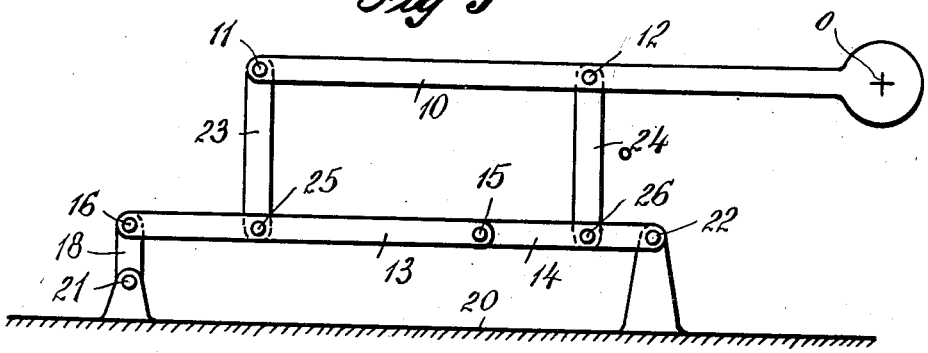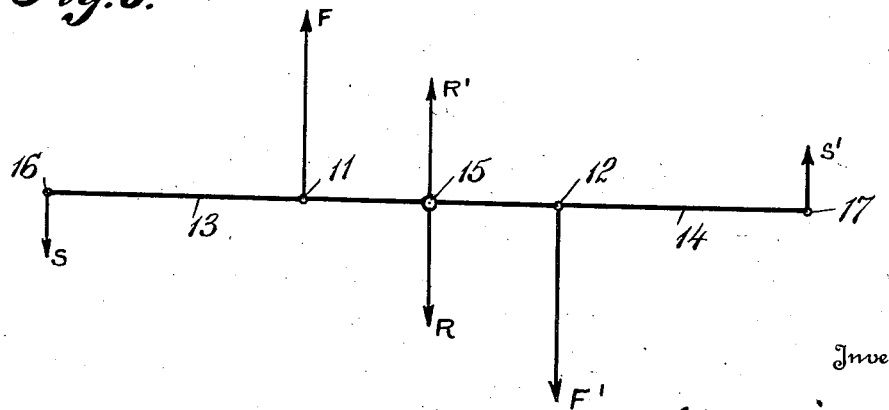

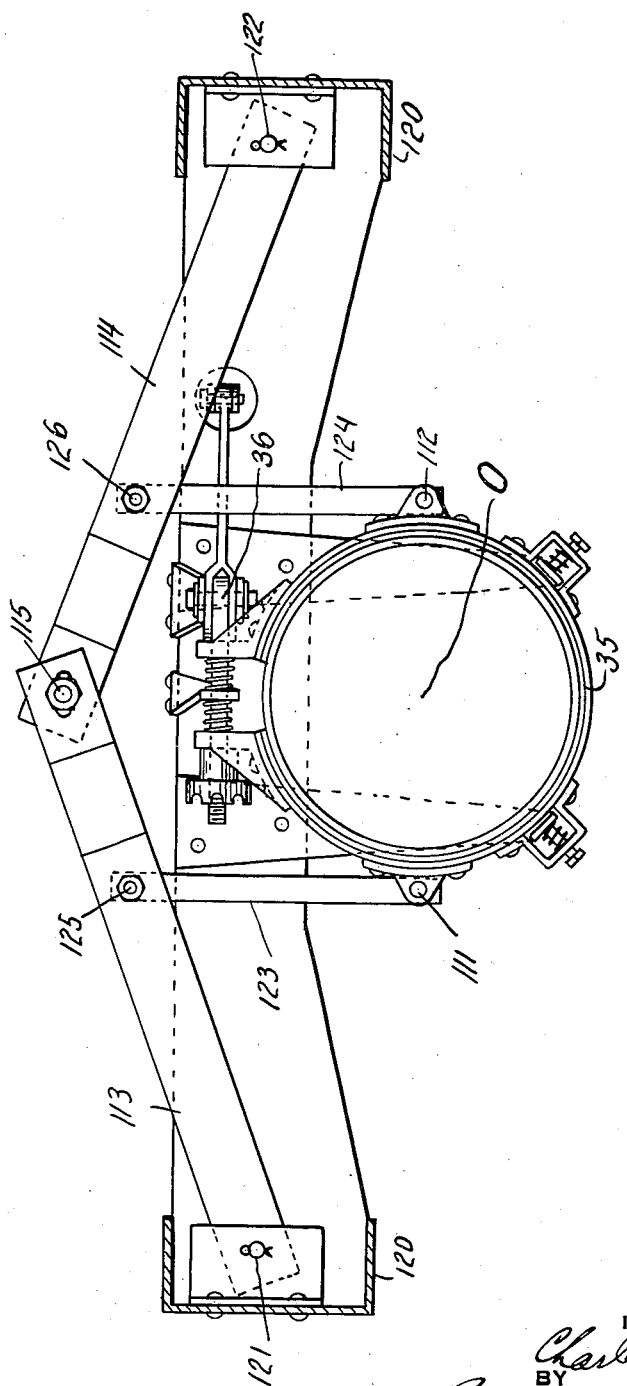

Patented May 5, 1931

1,803,895

UNITED STATES PATENT OFFICE

CHARLES B. CURTISS, OF BAY CITY, MICHIGAN

TORQUE EQUALIZING MECHANISM

Application filed June 20, 1928. Serial No. 286,983.

This invention relates to a mechanical element for equalizing the torques induced in a body by forces tending to rotate it about a center. For instance, when a brake band is contracted upon a brake drum, a torque is developed in the band tending to rotate it about the axis of the drum and it is necessary to resist or equalize this torque in order that the band may function in developing a braking effect. Similarly, when a worm mounted in a suitable supporting bearing is rotated to impart rotation to a worm wheel and a shaft on which it is mounted, a torque is developed in the supporting bearing tending to turn it about the axis of the shaft and it is necessary to resist or equalize this torque in order that the worm drive to the shaft may be effected. Heretofore mechanisms to oppose torque have usually been so applied that heavy radial loads have been put upon the shaft or supporting bearings, and even if partially or wholly balanced when properly adjusted, a slight mis-adjustment or wear has imposed heavy and undesirable radial loads on the shaft and bearings.

Torque, while usually being determined by multiplying one tangential force by the radius, is, in reality, always composed of an infinite number of couples which may be equated to one couple. Torque can be properly opposed only by setting up forces which are truly or substantially equal, opposite, parallel and non-coincident, i. e., a torque-opposing couple. If such a couple were mechanically set up, torque in any member could be opposed without any residual forces that are not completely or truly balanced, since the forces of the torque couple and the opposing couple nullify each other.

The present invention is directed to the provision of an improved mechanism for equalizing torque produced in a body and for simultaneously compensating for the slight movements of the body which may accompany a torque. The object of the invention is to provide a novel torque-equalizing mechanism which may be manufactured and applied at a relatively small cost, which is effective to equalize the torque by transmitting it in the form of two equal, non-coincident and opposite forces to a device mounted on a suitable support, and which is non-load-supporting, and flexible in all directions in the plane of application of the torque. This mechanical element may be applied to the support of brakes, worm-cases, and other similar units, and because it is non-load-supporting and can resist torque only, it may also be applied to torque-dynamometers, governors and similar mechanisms.

For a better understanding of the invention, reference is made to the accompanying drawings, in which Figs. 1 to 5 inclusive illustrate several embodiments of the torque equalizing mechanism of this invention, and Fig. 6 is a force diagram illustrating the principle of operation of the mechanism.

Fig. 7 illustrates the application of the mechanism to a band brake.

In these drawings 0 designates the point on a body about which the torque which it is sought to equalize acts, and which is preferably termed the "torque center" since the torque does not always act about some well-defined center such as the center of rotation of a shaft, although the torque center and center of rotation may coincide in many instances.

As shown in all of the arrangements illustrated, the several parts of the mechanism may be arranged rectilinearly, that is to say, so that the parts are either parallel or perpendicular to each other and consequently parallel or perpendicular to the directions of the forces which resist the torque. The parts are also non-rigidly connected together so that the whole mechanism is flexible for freedom of movement in the plane of its parts, which is also the plane in which the forces resisting the torque act.

As shown in the force diagram, it will be obvious that, when the mechanism is properly proportioned, the forces acting at the points where the mechanism is attached to the support may be maintained equal to each other. Each of the diagrams shown includes a pair of vertically disposed connecting links (see links 18 and 19 in Fig. 1) and these links should be parallel and of equal length, and under these conditions no unbalanced components of the forces which cause the torque can act. Accordingly the torque set up in a body may be equalized by a flexible, non-load-supporting mechanism of the character described which will permit of limited motion of the body in any direction in the plane of the resisting forces. Because of this flexibility the mechanism is self-adjusting to utilize the forces which cause the torque and no forces except the rectilinear forces of the torque, or any components of these torque forces can act in lateral or radial directions. Also, this flexibility permits a bodily shifting of the parts of the mechanism about the connections to the support so that any movement of the torque center 0 may be accommodated and compensated by the mechanism without detracting from its torque-equalizing capacity. Consequently, the structure of the mechanism may be such that it is in no wise load supporting, that is, it cannot support loads the forces of which act in the same direction, but can only utilize the oppositely acting forces which have a rotational tendency and cause the torque in the body with which it is associated.

Connected to the torque center 0, so as to receive the forces of the torque therefrom, is a rigid member 10 preferably of such dimension that at least two spaced points 11 and 12 thereon may be selected as the points at which the forces producing the torque act. In Fig. 1 points 11 and 12 on member 10 are pivotally connected to rigid bars or links 13 and 14, respectively, the inner ends of these links being pivotally connected together at 15. The opposite ends of links 13 and 14 are pivotally connected at 16 and 17 to short links 18 and 19, respectively, which in turn are pivotally connected to support 20 at points 21 and 22, respectively. Support 20 is relatively rigid or stationary with respect to torque center 0, while the several links 13, 14, 18 and 19 are movable relatively to torque center 0 about their various pivots.

In Fig. 2 auxiliary links 23 and 24 connect pivot points 25 and 26 of links 13 and 14 to points 11 and 12, respectively, while the outer end of link 14 is directly connected at 22 to support 20 instead of through a short link 19, as in Fig. 1. This arrangement provides a mechanism having greater degree of flexibility in all directions in its plane than that shown in Fig. 1. In Fig. 3 point 11 is located on member 10 at a greater distance from center 0 than point 12, and an auxiliary link 27 connects the inner ends of links 13 and 14 together at pivots 28 and 29, respectively, being substituted for the single pivot connections 15 of the mechanisms of Figs. 1 and 2, providing greater flexibility at the connection between the links 13 and 14. The mechanism of Fig. 4 differs from that illustrated in Fig. 3 in that the pivotal connections between links 13 and 14 and pivot points 21 and 22 of support 20 are auxiliary links 30 and 31, respectively, which are connected to links 13 and 14 at intermediate points 32 and 33, respectively, instead of at the ends thereof.

In Figs. 1 to 4 inclusive, the various parts comprising the mechanisms have been arranged symmetrically about the torque center 0, the links being proportioned equally with respect to the torque center 0, and their pivot points being spaced with definite relation thereto. While such arrangements are preferable in most installations, they may be altered within limits to meet various conditions of use and operation. For example, as shown in Fig. 5, the torque equalizing mechanism is not arranged symmetrically with respect to the torque center 0, but offset laterally therefrom. In this form the rigid member 10 connected to the torque center 0 is a lever, to spaced points 11 and 12 of which links 23 and 24 are pivotally connected, these links being in turn respectively pivoted to links 13 and 14 at points 25 and 26. The inner ends of links 13 and 14 are pivoted together at 15 while their outer ends are connected to support 20 in the same manner as is shown in Fig. 2. Fig. 6 may be considered the diagram of forces which act in a simple mechanism as shown in Fig. 1, and illustrates how the torque forces acting around any center 0 may be equalized by the mechanism of this invention. The two resulting forces, F and F', as described above, acting at points 11 and 12, will be parallel, and if the location of point 11 in relation to points 15 and 16 is similar, relatively, to the location of point 12 in relation to points 15 and 17, then forces F and F' will be equal as well as parallel. Under this condition, which will have to be maintained in order to avoid any residual radial force, the proportion of the force F which is transferred by the rigid link 13 to point 15, will be exactly the same as the proportion of force F' which will be transferred by the rigid link 14 to point 15. Therefore, since forces F and F' are equal and opposite, the proportions of these two forces transferred to point 15 will be equal and opposite, and will be balanced and ineffective. In the same way it may be shown that the forces transferred to points 16 and 17 are also equal and opposite. Thus it will be obvious that the forces in the links connecting the mechanism to the support are equal, opposite, and non-coincident, forming a perfect couple, and thus may resist torque, but cannot support a load in any one direction. If, for instance, force F were slightly greater than force F', there could be no support offered to this excess load at point 11. The mechanism will thus move in the direction of such excess, thereby increasing force F' until a perfect balance is again automatically gained. This flexibility with the automatic self-balancing of the forces, permits the mechanism to accommodate itself to any reasonable motion of the torque center.

A typical instance of application of the mechanism of this invention is for the equalization of the torque set up in a brake band when the band is tightened on the brake drum to produce the braking effect, and a description of such application will serve to illustrate the operation of the mechanism. Referring to Fig. 7, in which the invention is applied to a band brake for the purpose of equalizing the torque developed therein when the brake is applied to the rotating drum, numeral 35 designates the brake band which is adapted to be contracted by any conventional mechanism 36 for the purpose of braking the rotation of the brake drum and the shaft, not shown, but whose axis is in the center 0. The brake band 35 is suspended by auxiliary links 123 and 124 connected at opposite sides thereof by respective pins 111 and 112. The auxiliary links 123 and 124 are in turn pivoted on pins 125 and 126 to respective links 113 and 114 which are pivoted together by pin 115 and connected at their respective opposite ends by pins 121 and 122 to the chassis, truck or other frame or base 120. The friction which produces the braking effort is automatically resisted by two forces which are at all times equal and opposite, thus under all conditions eliminating the reaction on the shaft bearing due to the braking effort. This is the result if the friction of all parts of the brake band is equal, and is also the result if the friction of various parts of the band is variable, with one part exerting much greater braking effort than another. Thus, no matter what the wear on the brake band, there can never be any residual load on the shaft due to braking effort. This would permit of placing a brake drum in the center of a shaft, at a distance from any support, and no bending load would be put on the shaft due to the braking effort when applying the brake.

In a similar way a worm case may be supported at a distance from any bearing, and torque can be impressed on the shaft without causing a bending load in the shaft, if the worm case is held by the mechanism of this invention. Even if the bearings supporting the shaft wear, the mechanism will permit the worm case so to accommodate itself to the altered conditions that torque only will be impressed on the shaft, and there will be no added bending tendency, even after wear has allowed the worm case to move from its original position.

The mechanism may be similarly applied to great advantage in innumerable cases to equalize torques set up in mechanisms or machines, merely by connecting the mechanism between the part subjected to the torque and some suitable support. Because of its purpose, that of equalizing opposite forces acting on opposite sides of the center to produce torque, the mechanism is not designed to support any forces acting in the same direction, such as the weight of a machine element at its bearings, or the weight of worm-driving or braking mechanism and the like, but on the contrary, may be auxiliary mechanism to the weight-supporting parts.

The new mechanism for equalizing torques or other rotational effects produced by opposing forces accompanying relative movement in or between bodies is simple and efficient, employing no outside forces but only those introduced by the original torque forces, the effect of which is sought to be eliminated. While movement of certain of the parts comprising the equalizing mechanism is provided for this movement is extremely small and in most cases infinitesimal, so that little or no wearing can take place. Accordingly, the mechanism should have an indefinite life since no replacement of parts is necessary, and no care is required beyond occasional inspection. Although equalization by the new mechanism of the torques accompanying definite causes and effects has been described for purposes of illustration, it is to be understood that the mechanism is equally applicable to the equalization of torques produced by different causes, and in which balanced or only partially balanced opposite forces create objectionable strains in or upon mechanisms or relatively moving parts in or between which such opposite forces are set up. The embodiments of the invention described have been directed particularly to arrangements of links, levers or bars, but it is within the scope of this invention to replace those elements by other devices or substitute equivalent mechanism operating upon the same principles of mechanism described.

I claim:

1. In combination with a body subjected to torque, a relatively stationary support, a non-load-supporting means connecting the body to said support at two separated points substantially in the plane of action of the torque forces, whereby the forces causing the torque in the body are re-applied to the body in opposite directions to nullify the same.

2. Means for equalizing the torque in a body consisting of a relatively stationary support, and non-load-supporting connections from the body at two separated points to the support, said connections lying substantially in the plane of action of the torque forces and through which the forces causing the torque are reversed in direction at the two separated points.

3. Means for equalizing the torque in a body, consisting of a relatively stationary support, and non-rigid devices connected together and to two separated points on the body and support, in substantially the plane of action of the torque forces, said devices being adapted to reverse the forces causing the torque in the connections between the devices.

4. In combination with a body subjected to torque, a member connected to the torque center of the body, a relatively stationary support, at least two separate non-rigid connecting means between the member and the support, substantially in the plane of action of the torque forces, and non-rigid connections between the means.

5. In combination with a body subjected to torque, a member connected to the torque center of the body, a relatively stationary support, non-rigid means connected to at least two separated points on the support, and at least two separate connections between the member and the means, said means and connections lying substantially in the plane of action of the torque forces and producing a non-load-supporting structure.

6. In combination with a body in which two non-coincident and opposite forces act, at least two connections to the body through which the two forces act, a relatively stationary support, means connected together and to at least two points on the support, and separate connections between the first-named connections and the means.

7. In combination with a body in which two non-coincident and opposite forces act, at least two connections to the body through which the two forces act, a relatively stationary support, and movable connections between the support and the two first-named connections, said last-named connections being adapted to reverse the forces acting at the first-named connections.

8. In combination with a body in which two non-coincident and opposite forces act means connected at two separated points on the body through which these forces act, connections between said means, a relatively stationary support, and connections between said means and at least two separated points on the support.

9. In a torque equalizing mechanism, the combination with a single body subjected to the torque, of non-rigidly interconnected means non-rigidly connected at spaced points to the body and having a relatively fixed portion, said means being adapted to set up forces at said points equal and opposite to the torque forces at said points.

10. In a mechanism for equalizing a torque, the combination with a single body subjected to the torque, spaced means connected to the body for receiving the separate forces of the torque, a relatively stationary support, and non-rigid connections between said means and between the said means and the support adapted to reverse the torque forces.

11. In a mechanism for equalizing a torque, the combination with a single body subjected to the torque, means connected to spaced points on the body, non-rigid interconnections between the means remote from at least one of said points, a relatively stationary support, and means for non-rigidly connecting the first-named means with the stationary support.

12. In a mechanism for equalizing a torque, the combination with a single body subjected to the torque, at least two interconnected members each connected to spaced points on the body, a relatively stationary support, and connections between the members and the support at points spaced from their inter-connection and connections with the body.

13. A torque equalizer for a body subjected to a torque, comprising at least two members non-rigidly interconnected and non-rigidly connected to the body, a relatively stationary support connected with the members at points remote from the points of connection of the body and the members and remote from the interconnection of the members, said members lying substantially in the plane of action of the forces causing the torque.

14. A torque equalizer for a body subjected to a torque, comprising a pair of members flexibly inter-connected, a relatively stationary support to which the members are connected at points remote from their flexible interconnection, the body being non-rigidly attached to the members at points remote from their flexible interconnection and also remote from their connection to the support, said members lying substantially in the plane of action of the forces causing the torque.

15. A torque equalizer for a body subjected to a torque, comprising members connected at spaced points with the body, a relatively stationary support, other members non-rigidly interconnected and connected at spaced points to the support, and connections between the several first-named members and the several other members, the last-named connections being remote from the support connection and the interconnection.

16. A torque equalizer for a body subjected to a torque, comprising members connected at spaced points with the body, a relatively stationary support, other members non-rigidly interconnected and connected at spaced points to the support, and connections between the several first-named members and the several other members, all of the connections placing the members in rectilinear relation to each other.

17. The combination of a base, a member in which a torque is developed, and means for supporting the member upon the base permitting movement of the member in any direction in the plane in which it lies, said means serving also to transmit the torque produced in the member to the base.

18. The combination of a base, a member in which a torque is developed, and means for supporting the member upon the base, said means including two elements which are in contact with each other and adapted to receive opposite torque pressures whereby the torque producing those pressures is absorbed.

19. The combination of a base, a member in which a torque is developed, and means for supporting the member upon the base permitting movement of the member in any direction in the plane in which it lies, said means including two elements which are in contact with each other and adapted to receive opposite torque pressures whereby the torque producing those pressures is absorbed.

20. The combination of a base, a member in which a torque is developed, and means connecting the member to the base permitting movement of the member in any direction in the plane in which the torque forces act, said means including two elements which are in contact with each other and adapted to receive opposite torque pressures whereby that portion of the total torque which produces these pressures is absorbed, the balance of the torque being transmitted to the base.

21. In combination with a body subjected to torque, a support, and substantially parallel non-load-supporting members connecting the body to said support at separate points substantially in the plane of action of the torque forces, whereby the forces causing the torque in the body are reapplied thereto in opposite directions to nullify the same.

In testimony whereof I affix my signature.

CHARLES B. CURTISS.